(12) United States Patent
Fu et al.

(10) Patent No.: US 12,218,964 B2
(45) Date of Patent: Feb. 4, 2025

(54) REMOTE ATTESTATION IN NETWORK

(71) Applicant: Nokia Technologies Oy, Espoo (FI)

(72) Inventors: Anmin Fu, Shaanxi (CN); Jingyu Feng, Shaanxi (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 928 days.

(21) Appl. No.: 16/981,875

(22) PCT Filed: Mar. 21, 2018

(86) PCT No.: PCT/CN2018/079816
§ 371 (c)(1),
(2) Date: Sep. 17, 2020

(87) PCT Pub. No.: WO2019/178766
PCT Pub. Date: Sep. 26, 2019

(65) Prior Publication Data
US 2021/0037042 A1   Feb. 4, 2021

(51) Int. Cl.
*H04L 9/40* (2022.01)
(52) U.S. Cl.
CPC ...... *H04L 63/1433* (2013.01); *H04L 63/1425* (2013.01)
(58) Field of Classification Search
CPC ............. H04L 63/1433; H04L 63/1425; H04L 63/1483; H04L 2463/121; G06F 21/305; G06F 21/577; G06F 21/44; H04W 12/66; H04W 84/18
See application file for complete search history.

(56) References Cited

U.S. PATENT DOCUMENTS

| | | | |
|---|---|---|---|
| 11,563,764 B1 * | 1/2023 | Hoscheit | H04L 63/1433 |
| 2012/0260345 A1 * | 10/2012 | Quinn | G06F 21/57 726/26 |
| 2014/0150058 A1 | 5/2014 | Baig et al. | |

(Continued)

FOREIGN PATENT DOCUMENTS

| | | |
|---|---|---|
| CN | 103095589 A | 5/2013 |
| CN | 103957525 A | 7/2014 |

(Continued)

OTHER PUBLICATIONS

Extended European Search Report Report received for corresponding European Patent Application No. 18910342.7, dated Jan. 7, 2022, 14 pages.

(Continued)

*Primary Examiner* — Sarah Su
(74) *Attorney, Agent, or Firm* — LIPPES MATHIAS LLP

(57) ABSTRACT

The present disclosure relates to a remote attestation in a network. Embodiments provide a method comprising: attesting a first node in a network, by a node adjacent to the first node in the network; and generating an attestation result of the first node. A plurality of attestation results of the first node generated by a plurality of nodes adjacent to the first node in the network are combined to determine a credibility of the first node. In such embodiments, a fixed verifier for other nodes is eliminated, and a risk of a collapse due to a failure of such fixed verifier may be avoided.

14 Claims, 10 Drawing Sheets

(56) References Cited

U.S. PATENT DOCUMENTS

| | | | | |
|---|---|---|---|---|
| 2015/0023214 | A1* | 1/2015 | Soneda | H04W 40/24 |
| | | | | 370/254 |
| 2015/0244732 | A1* | 8/2015 | Golshan | H04L 63/145 |
| | | | | 726/24 |
| 2016/0366180 | A1 | 12/2016 | Smith et al. | |
| 2016/0366185 | A1 | 12/2016 | Lee et al. | |
| 2017/0126647 | A1* | 5/2017 | Zhang | H04L 63/08 |
| 2017/0126705 | A1* | 5/2017 | Mirashrafi | H04L 63/102 |
| 2017/0230418 | A1* | 8/2017 | Amar | H04L 67/01 |
| 2017/0317889 | A1* | 11/2017 | Moon | H04L 67/10 |
| 2018/0004948 | A1* | 1/2018 | Martin | H04L 63/1425 |
| 2018/0005243 | A1* | 1/2018 | Zovi | G06Q 20/405 |
| 2019/0044969 | A1* | 2/2019 | Pilkington | H04L 63/1433 |
| 2019/0228135 | A1* | 7/2019 | Jin | G06F 11/0757 |
| 2020/0153627 | A1* | 5/2020 | Wentz | H04L 9/50 |
| 2021/0271751 | A1* | 9/2021 | Fu | G06F 21/64 |
| 2022/0021690 | A1* | 1/2022 | Fu | H04L 9/088 |
| 2024/0305661 | A1* | 9/2024 | Smith | H04L 63/1433 |

FOREIGN PATENT DOCUMENTS

| | | | | |
|---|---|---|---|---|
| CN | 104780535 | A | | 7/2015 |
| CN | 106817700 | A | | 6/2017 |
| CN | 111869162 | B * | 6/2023 | G06F 21/305 |
| WO | WO-2018136087 | A1 * | 7/2018 | |
| WO | WO-2020052751 | A1 * | 3/2020 | G06F 21/44 |
| WO | WO-2021126590 | A1 * | 6/2021 | G06F 21/57 |

OTHER PUBLICATIONS

Partial European Search Report Report received for corresponding European Patent Application No. 18910342.7, dated Sep. 28, 2021, 16 pages.

Office action received for corresponding Chinese Patent Application No. 201880091397.6, dated Oct. 25, 2022, 10 pages of office action and no page of translation available.

Steiner et al., "Attestation in Wireless Sensor Networks: A Survey", ACM Computing Surveys, vol. 49, No. 3, Article 51, Sep. 2016, pp. 51:1-51:31.

Higgins et al., "Threats to the Swarm: Security Considerations for Swarm Robotics", International Journal on Advances in Security, vol. 2 No. 2&3, 2009, pp. 288-297.

Costin et al., "A Large-Scale Analysis of the Security of Embedded Firmwares", 23rd USENIX Security Symposium, 2014, pp. 95-110.

Miller et al., "A Survey of SCADA and Critical Infrastructure Incidents", Proceedings of the 1st Annual conference on Research in information technology, Oct. 2012, pp. 51-56.

Tan et al., "A Remote Attestation Protocol with Trusted Platform Modules (TPMs) in Wireless Sensor Networks", Security & Communication Networks, vol. 8, 2015, pp. 2171-2188.

Kil et al., "Remote Attestation to Dynamic System Properties: Towards Providing Complete System Integrity Evidence", IEEE/IFIP International Conference on Dependable Systems & Networks, 2009, pp. 115-124.

Kong et al., "PUFatt: Embedded Platform Attestation Based on Novel Processor-Based PUFs", 51st ACM/EDAC/IEEE Design Automation Conference (DAC), 2014, pp. 1-6.

Yang et al., "Towards a Low-Cost Remote Memory Attestation for the Smart Grid", Sensors, vol. 15, 2015, pp. 20799-20824.

Abera et al., "C-FLAT: Control-Flow Attestation for Embedded Systems Software", Proceedings of the ACM SIGSAC Conference on Computer and Communications Security, Oct. 2016, pp. 754-743.

Kiyomoto et al., "Lightweight Attestation Scheme for Wireless Sensor Network", International Journal of Security and Its Applications, vol. 8, No. 2, 2014, pp. 25-40.

Zhang et al., "DataGuard: Dynamic Data Attestation in Wireless Sensor Networks", IEEE/IFIP International Conference on Dependable Systems & Networks (DSN), 2010, pp. 261-270.

Jin et al., "Unpredictable Software-based Attestation Solution for node compromise detection in mobile WSN", IEEE Globecom Workshop on Advances in Communications and Networks, 2010, pp. 2059-2064.

Ibrahim et al., "DARPA: Device Attestation Resilient to Physical Attacks", ACM Conference on Security & Privacy in Wireless and Mobile Networks, 2016, pp. 171-182.

Koeberl et al., "TrustLite: A Security Architecture for Tiny Embedded Devices", Proceedings of the Ninth European Conference on Computer Systems, Apr. 2014, 14 pages.

Vetter et al., "Simulation Study on Code Attestation with Compressed Instruction Code", 8th IEEE International Workshop on Sensor Networks and Systems for Pervasive Computing, Mar. 12, 2019, pp. 296-301.

Perito et al., "Secure Code Update for Embedded Devices via Proofs of Secure Erasure", European Conference on Research in Computer Security, 2010, pp. 643-662.

Francillon et al., "A Minimalist Approach to Remote Attestation", Design, Automation & Test in Europe Conference & Exhibition (DATE), 2014, 6 pages.

Asokan et al., "SEDA: Scalable Embedded Device Attestation", ACM Sigsac Conference on Computer and Communications Security, 2015, pp. 964-975.

Ambrosin et al., "SANA: Secure and Scalable Aggregate Network Attestation", ACM Sigsac Conference on Computer and Communications Security, 2016, pp. 731-742.

Wang et al., "Enabling Security-enhanced Attestation With Intel SGX for Remote Terminal and IoT", IEEE Transactions on Computer-Aided Design of Integrated Circuits and Systems, vol. 37, No. 1, Jan. 2018, pp. 88-96.

Gong et al., "A Remote Attestation Mechanism for the Sensing Layer Nodes of the Internet of Things", Future Generation Computer Systems, vol. 78, 2018, pp. 867-886.

Yang et al., "Distributed Software-based Attestation for Node Compromise Detection in Sensor Networks", 26th IEEE International Symposium on Reliable Distributed Systems, 2007, 10 pages.

Kohnhauser et al., "Scalable Attestation Resilient to Physical Attacks for Embedded Devices in Mesh Networks", arXiv, Jan. 27, 2017, 15 pages.

Choi et al., "A Study on Sensor Nodes Attestation Protocol in a Wireless Sensor Network", The 12th International Conference on Advanced Communication Technology (ICACT), 2010, pp. 574-579.

International Search Report and Written Opinion received for corresponding Patent Cooperation Treaty Application No. PCT/CN2018/079816, dated Nov. 28, 2018, 9 pages.

\* cited by examiner

REMOTE ATTESTATION IN NETWORK

RELATED APPLICATION

This application claims priority to PCT Application No. PCT/CN2018/079816, filed on Mar. 21, 2018, of which is incorporated herein by reference in its entirety.

TECHNICAL FIELD

The present disclosure relates generally to the technology of network security, and in particular, to a remote attestation in a network.

BACKGROUND

With the development of the technology of network, it becomes easier and easier for any kind of electronic devices to access the network. These electronic devices will not be limited to conventional computing devices such as a personal computer. For example, a network of current Internet of Things (IoT) may contain "swarms" consisting of thousands of heterogeneous computing devices, such as distributed industrial controllers, smart home devices, or wearable devices. Those devices usually store a large amount of users' private information or affect the operation of the entire system. A compromised node may damage the users' information security, or lead to a collapse of the entire network quickly in a contagious manner. Therefore, it is important to ensure the security of those devices and prevent them from attacks.

SUMMARY

The present disclosure introduces a method and an apparatus for remote attestation in a network, which may improve solutions for these or other challenges.

A first aspect of embodiments may provide a method, including: attesting a first node in a network, by a node adjacent to the first node in the network; and generating an attestation result of the first node. A plurality of attestation results of the first node generated by a plurality of nodes adjacent to the first node in the network are combined to determine a credibility of the first node.

In embodiments of the present disclosure, the method further includes: obtaining the credibility of the first node; and disconnecting from the first node, in response to the credibility of the first node indicating the first node is untrustworthy.

In embodiments of the present disclosure, attesting the first node includes: obtaining a credit value of the first node; determining whether the credit value is less than a credit threshold; and attesting the first node, in response to the credit value being less than the credit threshold.

In embodiments of the present disclosure, attesting the first node includes: attesting the first node periodically.

In embodiments of the present disclosure, attesting the first node includes: sending an attestation request to the first node; and receiving an attestation response from the first node. The attestation result is generated based on the attestation response.

In embodiments of the present disclosure, generating the attestation result based on the attestation response includes: determining a response time of the first node; generating the attestation result indicating the attestation fails, in response to the response time is longer than a response time threshold; verifying the attestation response, in response to the response time being less than the response time threshold; generating the attestation result indicating the attestation fails, in response to the attestation response being unsuccessfully verified; and generating the attestation result indicating the attestation succeeds, in response to the attestation response being successfully verified.

In embodiments of the present disclosure, the method further includes: detecting an abnormal behavior of the first node; and reporting the abnormal behavior of the first node.

A second aspect of embodiments may provide a method, including: obtaining a plurality of attestation results of a first node from a plurality of second nodes adjacent to the first node in a network; and determining a credibility of the first node based on the plurality of attestation results.

In embodiments of the present disclosure, the method further includes: sending the credibility of the first node to the plurality of second nodes; and reporting the credibility of the first node through a tree structure in the network.

In embodiments of the present disclosure, the method further includes: setting, in response to the credibility of the first node indicating the first node is trustworthy, a credit value of the first node to a predetermined value.

In embodiments of the present disclosure, the method further includes: comparing the credibility of the first node and the plurality of attestation results; reducing, in response to one of the plurality of attestation results is contrary to the credibility of the first node, a credit value of the second node of the plurality of second nodes corresponding to the one attestation result; and increasing, in response to one of the plurality of attestation results corresponds to the credibility of the first node, a credit value of the second node of the plurality of second nodes corresponding to the one attestation result.

In embodiments of the present disclosure, determining the credibility of the first node based on the plurality of attestation results includes: computing a confidence level of the first node based on the plurality of attestation results and credit values of the plurality of second nodes; and determining the credibility of the first node based on the confidence level.

In embodiments of the present disclosure, determining the credibility of the first node based on the confidence level includes: comparing the confidence level with an attestation threshold; determining the credibility of the first node to indicate the first node is untrustworthy, in response to the confidence level being less than the attestation threshold; and determining the credibility of the first node to indicate the first node is trustworthy, in response to the confidence level being equal to or greater than the attestation threshold.

In embodiments of the present disclosure, the method further includes: receiving a report of an abnormal behavior of the first node from a second node; reducing a credit value of the first node; and reducing a credit value of the second node.

A third aspect of embodiments may provide a method, including: setting a credit value for a plurality of nodes in a network, respectively; assigning the plurality of nodes into a plurality of clusters; and selecting a third node with the highest credit value in a cluster as a cluster head. The third node is configured to: obtain a plurality of attestation results of a first node from a plurality of second nodes adjacent to the first node in the cluster; and determine a credibility of the first node based on the plurality of attestation results.

In embodiments of the present disclosure, the method further includes: receiving a report of the credibility of the first node; and checking the first node, in response to the credibility of the first node indicating the first node is untrustworthy.

In embodiments of the present disclosure, a plurality of third nodes in the network are organized in a tree structure.

In embodiments of the present disclosure, the third node is reselected periodically.

In embodiments of the present disclosure, the third node is reselected, in response to a decrease of a credit value for the third node.

In embodiments of the present disclosure, the method further includes: filling a blank area in a memory with an incompressible noise, during an initialization for a node of the plurality of nodes.

A fourth aspect of embodiments may provide an apparatus, including: at least one processor; and at least one memory including computer program code. The at least one memory and the computer program code are configured to, with the at least one processor, cause the apparatus to perform at least the following: attest a first node in a network, by a node adjacent to the first node in the network; and generate an attestation result of the first node. A plurality of attestation results of the first node generated by a plurality of nodes adjacent to the first node in the network are combined to determine a credibility of the first node.

A fifth aspect of embodiments may provide an apparatus, including: at least one processor; and at least one memory including computer program code. The at least one memory and the computer program code are configured to, with the at least one processor, cause the apparatus to perform at least the following: obtain a plurality of attestation results of a first node from a plurality of second nodes adjacent to the first node in a network; and determine a credibility of the first node based on the plurality of attestation results.

A sixth aspect of embodiments may provide an apparatus, including: at least one processor; and at least one memory including computer program code. The at least one memory and the computer program code are configured to, with the at least one processor, cause the apparatus to perform at least the following: set a credit value for a plurality of nodes in a network, respectively; assign the plurality of nodes into a plurality of clusters; and select a third node with the highest credit value in a cluster as a cluster head. The third node is configured to: obtain a plurality of attestation results of a first node from a plurality of second nodes adjacent to the first node in the cluster; and determine a credibility of the first node based on the plurality of attestation results.

A seventh aspect of embodiments may provide a computer program product including a computer-readable medium bearing computer program code embodied therein for use with a computer. The computer program code is configured to realize a computer process including: attesting a first node in a network, by a node adjacent to the first node in the network; and generating an attestation result of the first node. A plurality of attestation results of the first node generated by a plurality of nodes adjacent to the first node in the network are combined to determine a credibility of the first node.

A eighth aspect of embodiments may provide a computer program product including a computer-readable medium bearing computer program code embodied therein for use with a computer. The computer program code is configured to realize a computer process including: obtaining a plurality of attestation results of a first node from a plurality of second nodes adjacent to the first node in a network; and determining a credibility of the first node based on the plurality of attestation results.

A ninth aspect of embodiments may provide a computer program product including a computer-readable medium bearing computer program code embodied therein for use with a computer. The computer program code is configured to realize a computer process including: setting a credit value for a plurality of nodes in a network, respectively; assigning the plurality of nodes into a plurality of clusters; and selecting a third node with the highest credit value in a cluster as a cluster head. The third node is configured to: obtain a plurality of attestation results of a first node from a plurality of second nodes adjacent to the first node in the cluster; and determine a credibility of the first node based on the plurality of attestation results.

According to embodiments of the present disclosure, a remote attestation in a network is improved.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
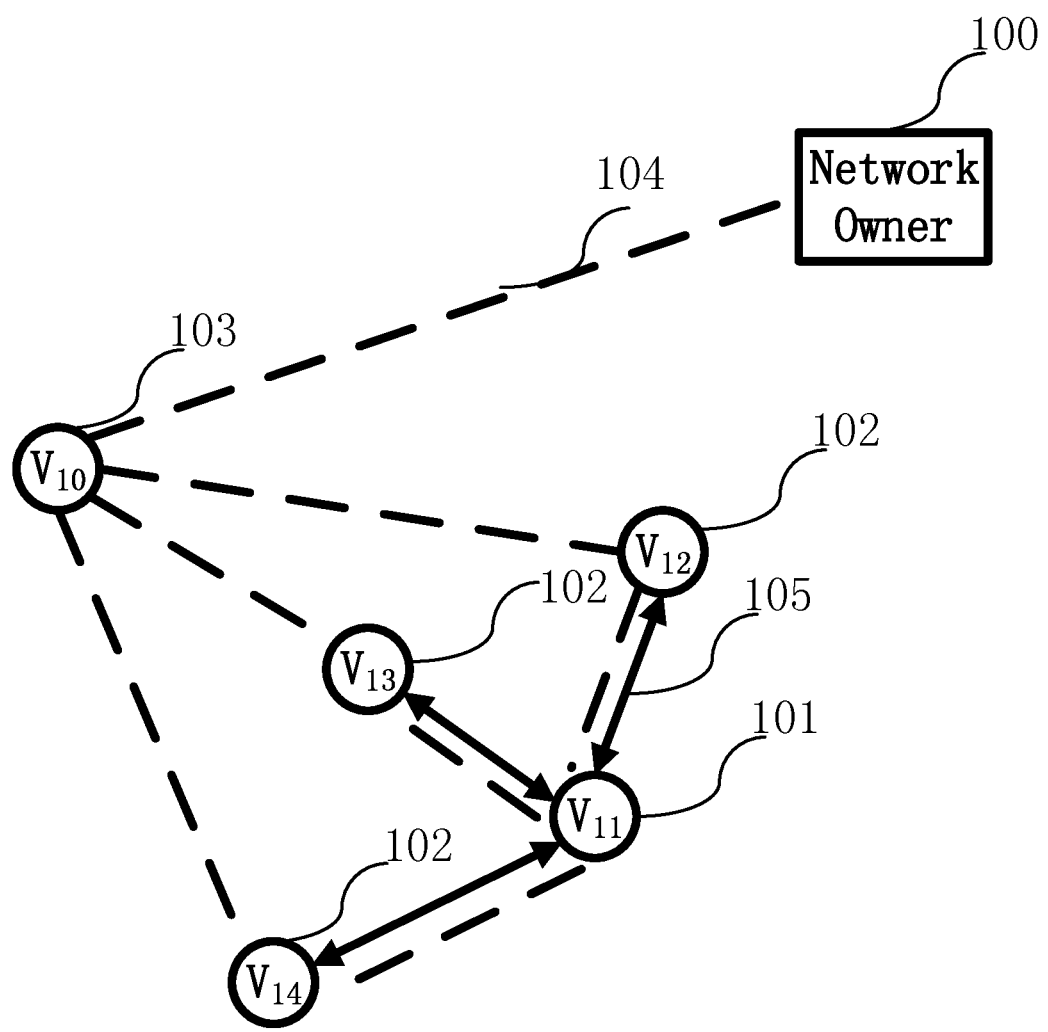
FIG. 1 is a schematic showing a network structure including a node to be attested in accordance with some embodiments.

FIG. 1 is a schematic showing a network structure including a node to be attested in accordance with some embodiments.

In an exemplary network, a network owner 100 is responsible for the operation of the network. The network owner 100 manages nodes, for example including $V_{10}$, $V_{11}$, $V_{12}$, $V_{13}$, and $V_{14}$. The network owner 100 may be any computing device capable of managing a network, such as a computer sever. The nodes in the network may be any electronic device capable of accessing network, such as a distributed industrial controller, a smart home device, or a wearable device. Communication link 104 between nodes $V_{10}$, $V_{11}$, $V_{12}$, $V_{13}$, and $V_{14}$, or between a node and the network owner 100 may be established and maintained by the network owner 100. The communication link 104 may be based on either wired hardware connection or wireless hardware connection, and may use any kind of communication protocol. The communication link 104 show an exemplary logic link, which does not necessarily mean that the two nodes of the communication link 104 are limited to transfer signals with each other directly in physical. The communication link 104 may be established with one or more intermedia nodes, such as a signal transfer router.

For the security of the whole network, the nodes needs to be attested regularly. For example, the network owner 100 may periodically send a specified message to each node in the network, and determine an attestation result for each node based on a response for the specified message. Such attestation manner may also be called as a challenge— response manner. This manner is easily to be implemented.

However, such manner may be inefficient in some case. In the network, the communication link between the node and the network owner 100 is usually indirect. The specified message has to pass through a plurality of intermediate nodes, thus the response time for the specified message would be unpredictable. The timing cost and the computing cost for the network owner 100 is increased. Further, without a predictable time limitation, an attacker may have enough time to forge or modify the response of a compromised node to pretend normal. Additionally, a periodical response for the specified message to the network owner 100 is also a burden for the node, since the node in the network, especially in IoT, is usually limited in energy capacity.

Figure 2:
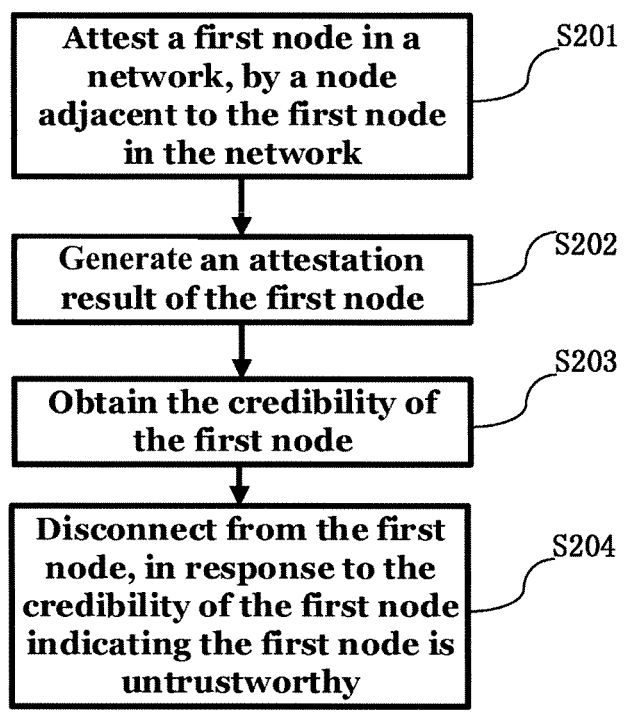
FIG. 2 is a schematic showing a first exemplary method for attestation in the network in FIG. 1 in accordance with some embodiments.

FIG. 2 is a schematic showing a first exemplary method for attestation in the network in FIG. 1 in accordance with some embodiments.

See FIG. 2, embodiments of the present disclosure introduce a method to further improve the attestation for a first node in the network. The method includes: step S201, attesting a first node in a network, by a node adjacent to the first node in the network, and step S202, generating an attestation result of the first node. A plurality of attestation results of the first node generated by a plurality of nodes adjacent to the first node in the network are combined to determine a credibility of the first node.

For the first node in the network, there usually are a plurality of second nodes adjacent to the first node. As an example, node $V_{11}$ in FIG. 1 is illustrated as the first node 101 to be attested, and nodes $V_{12}$, $V_{13}$, $V_{14}$ are illustrated as the plurality of second nodes 102 to implement the method shown in FIG. 2. "11, 12, 13, 14" are used as ID numbers for the nodes. Attestation interactions 105 exist between the first node 101 and the second nodes 102.

As shown in FIG. 2, each of the second nodes $V_{12}$, $V_{13}$, $V_{14}$ may attest the first node $V_{11}$. In such manner, one prover (the first node 101) may be attested by many verifiers (the second nodes 102). Therefore, a fixed verifier for other nodes is eliminated, and a risk of a collapse due to a failure of such fixed verifier may be avoided. This many-to-one attestation scheme would improve the security performance for the network, particularly for a network including many distributed nodes, such as swarms of IoT.

The method further includes: step S203, obtaining the credibility of the first node; and step S204, disconnecting from the first node, in response to the credibility of the first node indicating the first node is untrustworthy.

Namely, once the nodes $V_{12}$, $V_{13}$, $V_{14}$ find that the node $V_{11}$ is untrustworthy, they all disconnect form the node $V_{11}$ immediately. Therefore, the damage due to a compromised node $V_{11}$ may be limited.

The specific attestation interactions 105 may utilize any attestation strategy. As an example, an improved challenge-response strategy will be illustrated bellow.

Figure 3:
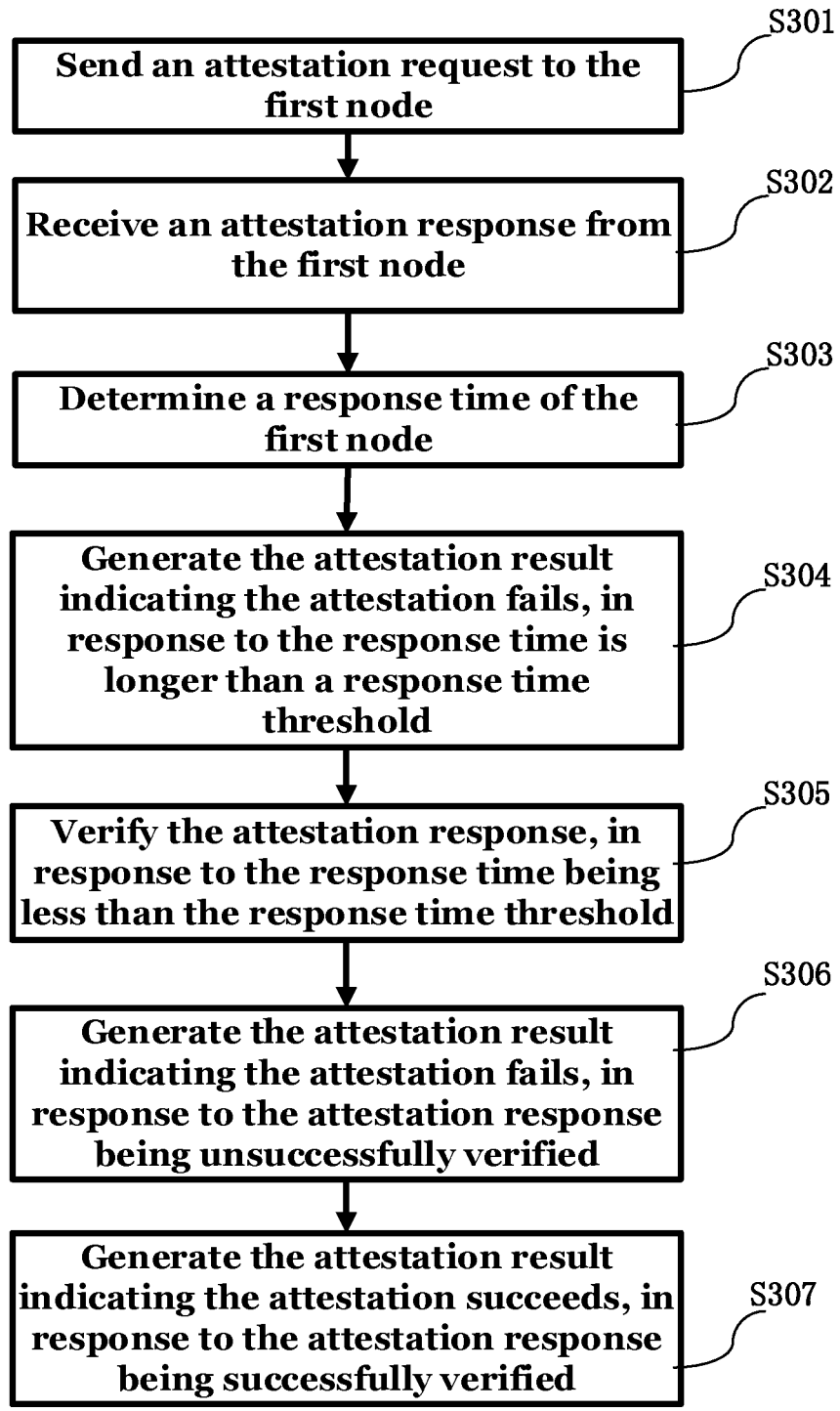
FIG. 3 is a schematic showing an exemplary sub process of S201 and S202 in FIG. 2.

FIG. 3 is a schematic showing an exemplary sub process of S201 and S202 in FIG. 2.

See FIG. 3, an attestation for the first node by a second node of the at least one second node may include: step S301, sending an attestation request to the first node; and step S302, receiving an attestation response from the first node. Then the attestation result may be generated based on the attestation response as in the following steps: step S303, determining a response time of the first node; step S304, generating the attestation result indicating the attestation fails, in response to the response time is longer than a response time threshold; step S305, verifying the attestation response, in response to the response time being less than the response time threshold; step S306, generating the attestation result indicating the attestation fails, in response to the attestation response being unsuccessfully verified; and step S307, generating the attestation result indicating the attestation succeeds, in response to the attestation response being successfully verified.

Taking the attestation interaction 105 between the node $V_{11}$ and the node $V_{12}$ as an example, in step S301, the node $V_{12}$ sends a first message ch, as attestation request (also named as a challenge) to the node $V_{11}$. The first message ch may contain a specifical identifier, such a nonce a which may also prevent replay attacks. The first node $V_{11}$ uses the nonce a to produce a response r, and then sends a second message including the response r to the node $V_{12}$. The second message may be encrypted by the node $V_{11}$ to prevent accessing not from the node $V_{12}$.

In step S302, the node $V_{12}$ receives the second message, and obtains the response r. An attestation result b will be generated, based on the second message including the response r.

In step S303, the node $V_{12}$ determines a response time of the first node, the response time is a time period form sending the first message to receiving the second message.

In step S304, the response time is verified at first. If the response time is longer than a response time threshold, the attestation fails, since the node $V_{11}$ may be compromised to make extra calculation or process which need extra time. The strict time control improves the security of the network.

The node $V_{12}$ records the time of sending the first message ch, and the time of receiving the second message. The time period from sending to receiving is calculated, and is compared with the response time threshold Tt, which is predetermined. If the time period is larger than the response time threshold Tt, the first attestation result b is set as a value indicating failed, such as "−1". The response time threshold Tt may be determined according to the specific type of the first node. A plurality of attestation tests may be done in a normal situation for the specific type of the first node previously, so as to collect the normal response time for this type of the first node. Then, the normal response time itself, or a value which is a little bigger than the normal response time may be used for the response time threshold Tt.

In step S305, if the response time is less than a response time threshold, the response r will be further verified. The response r is compared with an expected response re stored in the second node. As a usual example, the expected response re is calculated by the node $V_{12}$, based on the nonce a and previously stored information, such as a specified calculation function previously exchanged with the node $V_{11}$. The response r should correspond to the expected response re. For example, there may be a fixed relationship between them, or they may be just exactly the same.

In the step S306, if the response r does not correspond to the expected response re, the first attestation result b is set as a value indicating failed, such as "−1". In the step S307, if the response time period is not larger than the response time threshold Tt, and the response r corresponds to expected response re, the first attestation result b is set as a value indicating passed, such as "1". It should be understood any other numeric may be adopted to indicate the result of failed or passed, such as "1" for passed, "0" for failed.

In embodiments of the present disclosure, adjacent nodes are utilized to attest a prover, which makes it much easier to estimate the time of attestation and improve the security performance of the network.

Figure 4:
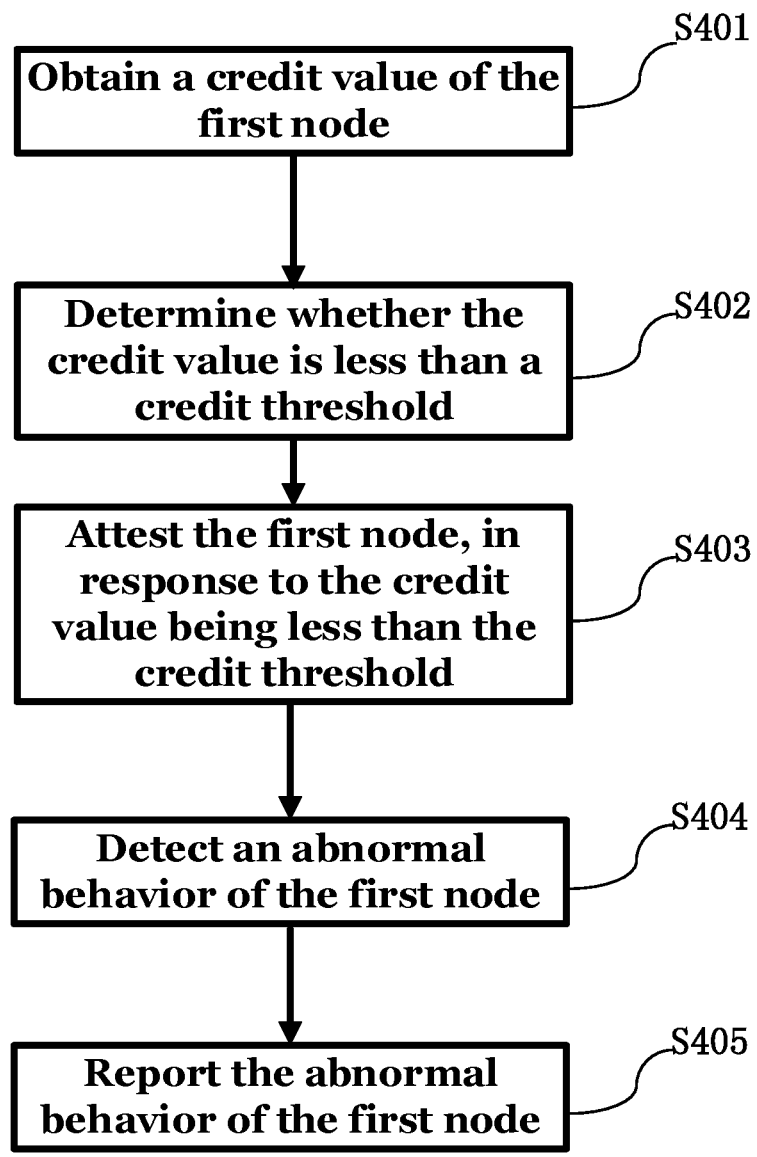
FIG. 4 is schematic showing other exemplary steps of method shown in FIG. 2 in accordance with some embodiments.

FIG. 4 is schematic showing other exemplary steps of method shown in FIG. 2 in accordance with some embodiments.

In embodiments of the present disclosure, attesting the first node includes: step S401, obtaining a credit value of the first node; step S402, determining whether the credit value is less than a credit threshold; and step S403, attesting the first node, in response to the credit value being less than the credit threshold.

The credit value of the first node is adjustable for indicating whether the first node needs attestation or not. As an example, for adjusting the credit value of the first node, the method further includes: step S404, detecting an abnormal behavior of the first node; and step S405, reporting the abnormal behavior of the first node. The report of the abnormal behavior will lead a decrease of the credit value of the first node.

The node $V_{11}$ may have a credit value $w_{11}$, initialized as 3. The credit value may be limited from 0 to 5. With an upper limitation, even the highest credit value is decreased quickly to trigger the attestation, in response to one or a few more abnormal behavior. A credit value threshold may be set to 1.

In embodiments, the credit value threshold may be adjusted according to the actual situation.

Table 1 shows an exemplary abnormal behavior form, wherein the points for each abnormal behavior may be adjusted according to actual situation.

TABLE 1

| Abnormal behavior form | |
| --- | --- |
| Abnormal behavior | Points |
| Abnormal request | −1 |
| Abnormal delay | −1 |
| Operation stopped | −3 |
| Unreasonable energy costs | −2 |
| Abnormal information transmission | −1 |
| Abnormal position movement | −2 |

According to the table 1, when the node $V_{12}$ detects an abnormal request form the node $V_{11}$, the node $V_{12}$ reports the detection of the abnormal request. The credit value $w_{11}$ may be subtracted by, for example 1, to equal to 2. After several times, the credit value $w_{11}$ may be subtracted to 0, which is less than 1. Accordingly, the attestation for the node $V_{11}$ will be started due to this detection of its abnormal behavior.

Therefore, with the credit value and the detection of the abnormal behavior, the attestation for a node may be quickly implemented, as soon as the node behaves suspiciously.

As another example, the first node may be attested periodically. A valid time period of attestation may be used to trigger the attestation, additionally or alternatively with the credit value. If the first node joined the network for the first time, an attestation time certificate $cert(t_a, t_e)$ will be issued to the first node. Wherein $t_a$ represents the time point of joining the network or the last attestation, and $t_e$ represents the valid time period of attestation. When another time point $(t_a+t_e)$ is reached, the first node will be attested by its adjacent nodes. Namely, in every time period of $t_e$, the first node will be attestated at least once. Thus, the situation that a node is never be attested may be avoided.

Figure 5:
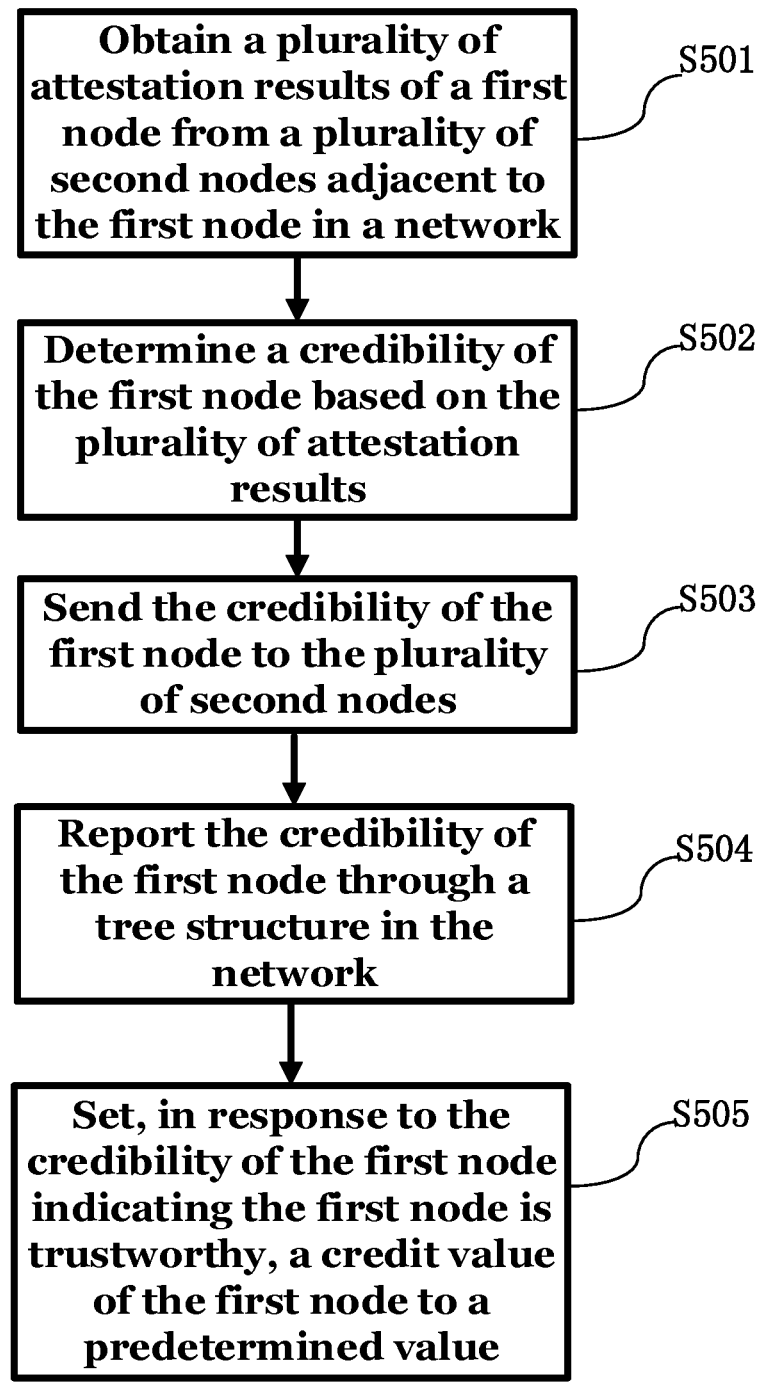
FIG. 5 is a schematic showing a second exemplary method for attestation in the network in FIG. 1 in accordance with some embodiments.

FIG. 5 is a schematic showing a second exemplary method for attestation in the network in FIG. 1 in accordance with some embodiments.

Embodiments of the present disclosure may provide a method, including: step S501, obtaining a plurality of attestation results of a first node from a plurality of second nodes adjacent to the first node in a network; and step S502, determining a credibility of the first node based on the plurality of attestation results.

The a plurality of second nodes $V_{12}$, $V_{13}$, $V_{14}$ in FIG. 1 may produce a plurality of attestation results $b_{12,11}$, $b_{13,11}$, $b_{14,11}$, wherein $b_{12,11}$ means the attestation result to $V_{11}$ made by $V_{12}$, $b_{13,11}$ means the attestation result to $V_{11}$ made by $V_{13}$, and $b_{14,11}$ means the attestation result to $V_{11}$ made by $V_{14}$. These attestation results $b_{12,11}$, $b_{13,11}$, $b_{14,11}$ may be further aggregated to generate a credibility.

As an example, in step S502, the attestation results may be directly summed up to obtain the credibility, since they are set as values as above described. The bigger the sum is, the more credible the first node is.

As another example, in S502, determining the credibility of the first node based on the plurality of attestation results includes: computing a confidence level of the first node based on the plurality of attestation results and credit values of the plurality of second nodes; and determining the credibility of the first node based on the confidence level.

In embodiments of the present disclosure, determining the credibility of the first node based on the confidence level includes: comparing the confidence level with an attestation threshold; determining the credibility of the first node to indicate the first node is untrustworthy, in response to the confidence level being less than the attestation threshold; and determining the credibility of the first node to indicate the first node is trustworthy, in response to the confidence level being equal to or greater than the attestation threshold.

In such steps, firstly, a normalized sum $s_j$ may be calculated by the following formula, as the confidence level:

$$s_j = \frac{\Sigma(b_{i,j} \times w_i)}{\Sigma w_i},$$

wherein j is the ID number of the first node, i is the ID number of the second node. Since $b_{i,j}$ equals to −1 or 1, $s_j$ is value in a range from −1 to 1. As to the FIG. 1, the normalized sum $s_j$ is calculated accordingly:

$$s_{11} = \frac{b_{12,11} \times w_{12} + b_{13,11} \times w_{13} + b_{14,11} \times w_{14}}{w_{12} + w_{13} + w_{14}},$$

wherein $w_{13}$ is the credit value for the node $V_{13}$, and $w_{14}$ is the credit value for the node $V_{14}$.

An attestation threshold g indicates the evaluation standard. The bigger the attestation threshold g is, the harder it is for the node $V_{11}$ to pass the attestation. For example, if the attestation threshold g is 1, the node $V_{11}$ will pass the attestation only when every $b_{i,j}$ equals to 1. The attestation threshold g may be set to 0.5 as an example, which is selected form a range from 0 to 1.

Other formulas are presented to implement the calculation:

$$e = \frac{s_j}{g};$$

$$f = \begin{cases} \frac{e-1}{|e-1|}, & e \neq 1 \\ 1, & \text{otherwise} \end{cases}$$

wherein e indicates the rate about $s_j$ and g, f is the credibility. According to the formulas, if $s_j$ is bigger than g, then e is bigger than 1, and f=1. If $s_j$ is less than g, then e is less than 1, and f=−1. When e=1 or g=0, these formula needs not to be calculated, and the first node 101 is determined as passed. According to such formulas, the value of the credibility f has the same meaning with the attestation result $b_{i,j}$, "1" indicates passed, "−1" indicates failed. When the node $V_{11}$ passes the attestation, the network owner 100 or the node $V_{10}$ will increase the credit value $w_{11}$ to be bigger than the credit value threshold, so as to stop the attestation process. When the first node 101 fails the attestation, the network owner 100 will disconnect the node $V_{11}$ from other nodes. Additionally, the network owner 100 may take further check or report to a user or engineer, so as to isolate protect or recover the node $V_{11}$. When the node $V_{11}$ is trustworthy, the confidence level may be further used to set the new credit value, to close the attestation process. For example, the confidence level may be multiplied with the upper limitation of the credit value.

This aggregation process may be implemented by any node, such as one of second nodes $V_{12}$, $V_{13}$, and $V_{14}$ which is further authorized, or just by the network owner 100. In FIG. 1, as an example, a node $V_{10}$ is selected by the network owner 100 as a third node 103, to implement the aggregation process. The third node 103 may be also a cluster head in the network. The arrangement of node $V_{10}$ may increase the speed of attestation, and reduce the burden of the network owner and the network transmission.

The method implemented at the third node further include: step S503, sending the credibility of the first node to the plurality of second nodes; and step S504, reporting the credibility of the first node through a tree structure in the network.

After the node $V_{10}$ finished the aggregation process, the credibility is sent from the node $V_{10}$ to the nodes $V_{12}$, $V_{13}$, and $V_{14}$, and the network owner 100. The nodes and the network owner 100 then operates according to the credibility. For example, if the credibility indicates the node $V_{11}$ is untrustworthy, as described above, the node $V_{12}$, $V_{13}$, and $V_{14}$ will disconnect from the node $V_{11}$. If the credibility indicates the node $V_{11}$ is trustworthy, the nodes and the network owner will operate with the node $V_{11}$ as normal, and the node $V_{10}$ will set the credit value of the first node to a predetermined value as in step S505. The predetermined value may be just bigger than the credit value threshold, so as to close the attestation process.

Further, the node $V_{10}$ may send the credibility to the network owner 100 through a tree structure in the network, to improve the transmission efficiency.

The attestation result $b_{i,j}$ and the credibility f may be further used to adjust the credit values of the second nodes 102, namely, nodes $V_{12}$, $V_{13}$, $V_{14}$.

Figure 6:
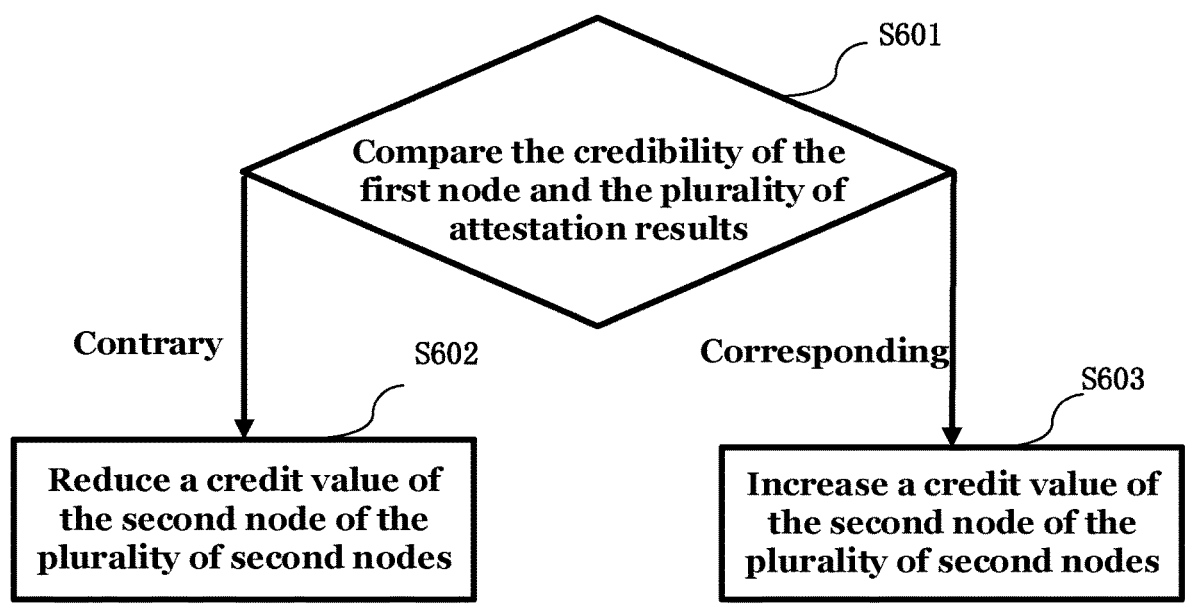
FIG. 6 is a schematic showing other exemplary steps of method shown in FIG. 5 in accordance with some embodiments.

FIG. 6 is a schematic showing other exemplary steps of method shown in FIG. 5 in accordance with some embodiments.

The method further includes: S601, comparing the credibility of the first node and the plurality of attestation results; S602, reducing, in response to one of the plurality of attestation results is contrary to the credibility of the first node, a credit value of the second node of the plurality of second nodes corresponding to the one attestation result; and S603, increasing, in response to one of the plurality of attestation results corresponds to the credibility of the first node, a credit value of the second node of the plurality of second nodes corresponding to the one attestation result.

As the example described above, the credibility of the first node and the attestation result are all represented as number "−1", or "1". When they are the same, they correspond to each other, and when they are different, they are contrary with each other. For example, for the node $V_{12}$, if the first attestation $b_{12,11}$ (−1) is different with the credibility f(1), the credit value $w_{12}$ for the node $V_{12}$ is reduced. Otherwise, if they are the same, the credit value $w_{12}$ for the node $V_{12}$ is increased. Therefore, the credit value, namely, the weight for attestation of the second nodes 102 can be adjusted dynamically after each attestation.

For adjustment for the credit value with abnormal behavior detection, the method further includes: receiving a report of an abnormal behavior of the first node from a second node; reducing a credit value of the first node; and reducing a credit value of the second node.

For example, when the node $V_{12}$ reports the detection of the abnormal behavior of the node $V_{11}$, a credit value $w_{12}$ for the node $V_{12}$ may also be reduced, so as to avoid malicious report. The reduction of the credit value for the second node may be proportional to the reduction of the credit value for the first node, so as to avoid a too strict rule for the reporter. The proportional rate may be 0.5, thus in this example, the credit value $w_{12}$ for the node $V_{12}$ may be subtracted by 0.5.

If the credit value $w_{12}$ is also less than the credit value threshold, an attestation for the node $V_{12}$ may also be implemented after the attestation for the node $V_{11}$. Namely, a role of one node in the network is not limited. The node may be a prover (first node) when itself needs to be attested, and may be a verifier (second node) when an adjacent node needs to be attested.

Figure 7:
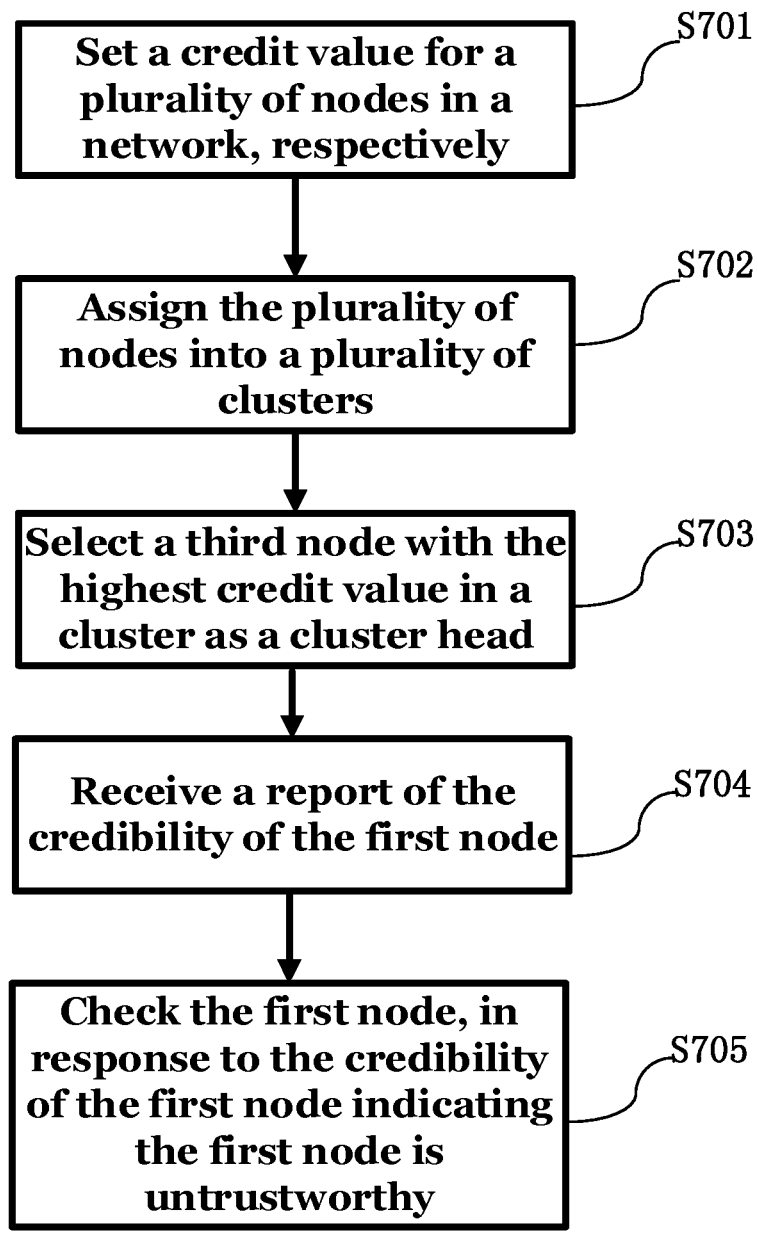
FIG. 7 is a schematic showing a third exemplary method for attestation in the network in FIG. 1 in accordance with some embodiments.

FIG. 7 is a schematic showing a third exemplary method for attestation in the network in FIG. 1 in accordance with some embodiments.

The method includes: step S701, setting a credit value for a plurality of nodes in a network, respectively; step S702, assigning the plurality of nodes into a plurality of clusters; and step S703, selecting a third node with the highest credit value in a cluster as a cluster head. The third node is configured to: obtain a plurality of attestation results of a first node from a plurality of second nodes adjacent to the first node in the cluster; and determine a credibility of the first node based on the plurality of attestation results.

In step S701, the credit value for each node may be set by the network owner when the network is created and initialized. When a new node is insert to the network, a new credit value for the new node is created and broadcasted to relevant nodes, such as adjacent nodes. Each node may record a credit value table to store credit values for its relevant nodes. When a node received a new credit value broadcasting, if it relates to a relevant node, the new credit value will be added to or refreshed in the credit value table, otherwise the new credit value will be discarded.

In step S703, the third node 103, namely, a cluster head, is selected based on the credit value. For example, a third node with a highest credit value in a cluster in the network is selected, for obtaining the credibility based on the plurality of attestation result. Namely, in embodiments, the node $V_{10}$ is selected, since its credit value $w_{10}$ is higher than nodes $V_{11}$, $V_{12}$, $V_{13}$, and $V_{14}$.

With the credit value as a standard, the third node 103 may be periodically reselected. Further, if the credit value for the current third node 103 decreases, the network owner 100 may reselect a new third node 103 immediately. They security performance is further improved.

The number of cluster heads is determined by the size of the swarm. The selection of cluster heads should take into account the distance between each other so that the cluster heads could distribute as evenly as possible in the swarm. The remaining nodes connect to their nearest cluster head, to form clusters.

The method further includes: step S704, receiving a report of the credibility of the first node; and step S705, checking the first node, in response to the credibility of the first node indicating the first node is untrustworthy. After the node $V_{10}$ report the credibility of the node $V_{11}$ indicating the first node is untrustworthy to the network owner 100, the network owner 100 may remove or reconnect the node $V_{11}$ according to the result of checking. Or, with a strict security strategy, the network owner 100 may directly remove the node $V_{11}$ from the network without checking.

Figure 8:
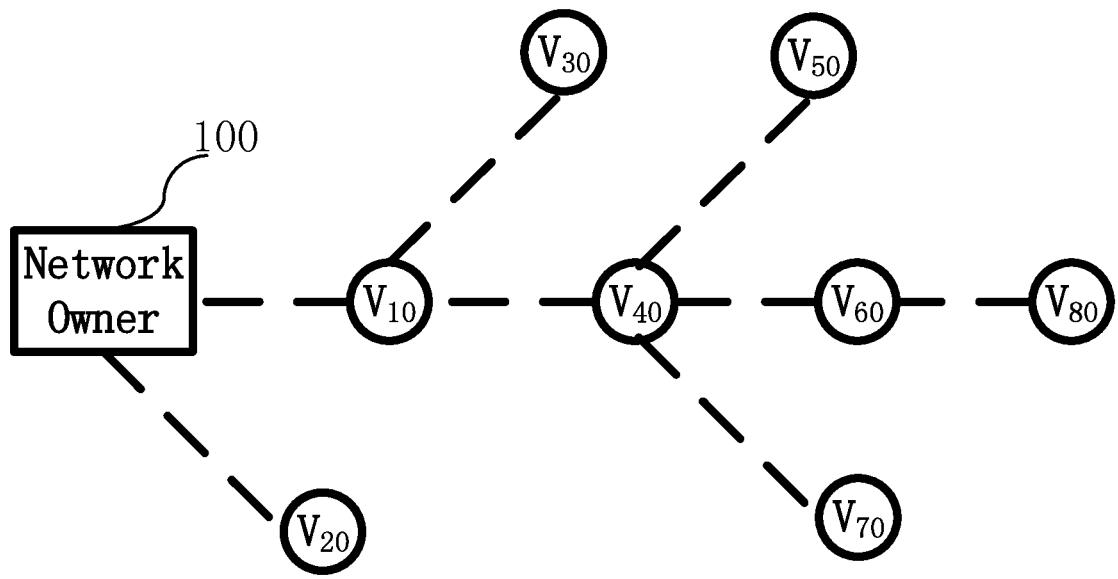
FIG. 8 is a schematic showing a tree structure in the network.

FIG. 8 is a schematic showing a tree structure in the network. Several cluster heads (the third nodes 103, namely, nodes $V_{10}$, $V_{20}$, $V_{30}$, $V_{40}$, $V_{50}$, $V_{60}$, $V_{70}$, $V_{80}$ . . . ) and network owner 100 may be organized in a tree structure according to the proximity principle as shown in FIG. 8. Other nodes (such as $V_{11}$, $V_{12}$, $V_{13}$, and $V_{14}$) will send their current credit values and the identifiers to the cluster heads (such as $V_{10}$) when connecting. The network owner 100 holds the credit values of all nodes.

As shown in FIG. 8, the credibility is transmitted form the third nodes 103 to the network owner 100 through a tree-structure in the network. Tree structure in the network can support parallel computing much easier, so as to improving the efficiency of information transfer. Further, utilizing multi-hop message transmission through cluster heads and controlling single-hop transmission distance into a certain range can tremendously reduce the energy cost, since a long distance single hop transmission will be eliminated. Specifically, if all nodes are concentrated in a certain area, there may be only one cluster without the need of multi-hop data transmission.

Figure 9:
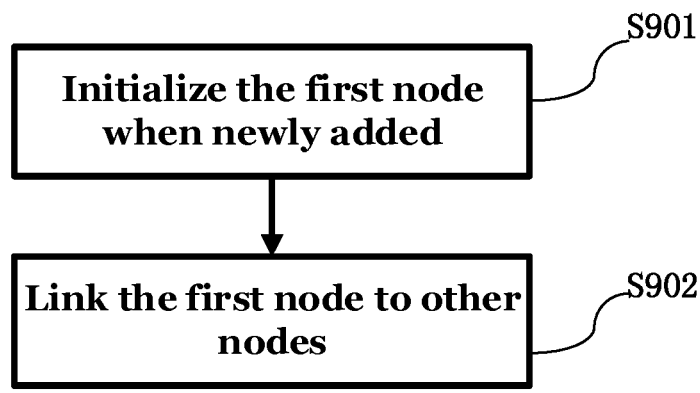
FIG. 9 is a schematic showing other exemplary steps of method shown in FIG. 7 in accordance with some embodiments.

FIG. 9 is a schematic showing other exemplary steps of method shown in FIG. 7 in accordance with some embodiments.

A proper preparation for attestation may be finished during initialization of a newly added node, so as to improve the efficiency. Still taking the node $V_{11}$ as a newly added node for example, in step S901, the network owner 100 initializes the node $V_{11}$, to generate the basic configuration of $V_{11}$, including a secret key $sk_{11}$, a public key $pk_{11}$, an identity certificate cert($pk_{11}$), an code certificate cert($h_{11}$), an credit value $w_{11}$ with an initial number, the maximum attestation time $t_{11}$ and a unique device identifier $d_{11}$. The maximum attestation time $t_{11}$ may be used as the response time threshold Tt for node $V_{11}$, when the node $V_{11}$ is attested.

The initialization process may be illustrated as the following formula:

$$\text{initial}(V_i; h_i) \rightarrow (sk_i, pk_i, \text{cert}(pk_i), \text{cert}(h_i), w_i, t_i, d_i),$$

wherein i means the ID number of the node, such as 11, $h_i$ means a hash code of $V_i$.

In S902, the node $V_{11}$ is linked to other nodes, such as the node $V_{12}$. They exchange their code certificates, identity certificates, device identifiers, maximum attestation time and the current credit values. Then they will generate a symmetric keys kg, based on their secret keys and code certificates. The initialization process may be illustrated as the following formula: link [$V_i$: $sk_i$; $V_j$: $sk_j$;*: cert($pk_i$),cert ($pk_j$), cert($h_i$), cert($h_j$), $t_i,t_j,d_i,d_j,w_i,w_j$]→[$V_i$: $k_i$; $V_j$: $k_{ij}$]; wherein i means one ID number of the node, such as 11, and j means another ID number of the node, such as 12. The node $V_{11}$ will be able to send a message encrypted with the symmetric key $k_{11,12}$ to the node $V_{12}$ and this encrypted message cannot be decrypted by nodes other than the node $V_{12}$. The security performance for normal communication and attestation will be further improved. The utilization of the symmetric key will improve the efficiency.

During initialization for the node $V_{11}$, other steps may also be used for improve the security. For example, a blank area in a memory of the first node may be filled with an incompressible noise, during an initialization for the first node.

Figure 10:
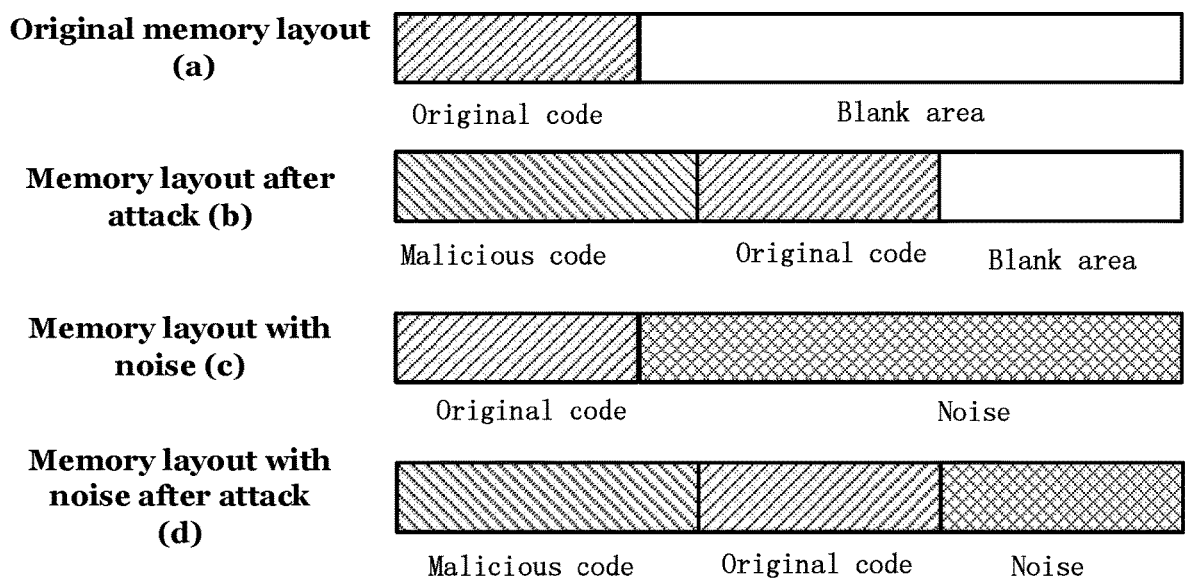
FIG. 10 is a schematic showing a memory layout of the first node during initialization.

FIG. 10 is a schematic showing a memory layout of the first node during initialization. See FIG. 10, in an original memory layout (a) including original code without the noise, attackers can easily use the blank area to store the original code and do not change the hash code of the whole program at the same time. The memory layout after attack (b) shows the malicious code, original code and blank area. However, if the blank area is filled with incompressible noise, as shown in the memory layout with noise (c), attackers can only delete part of the noise space to store the malicious code, as shown in the memory layout with noise after attack (d). In that case, they also change the hash code which could be detected by the attestation program.

Figure 11:
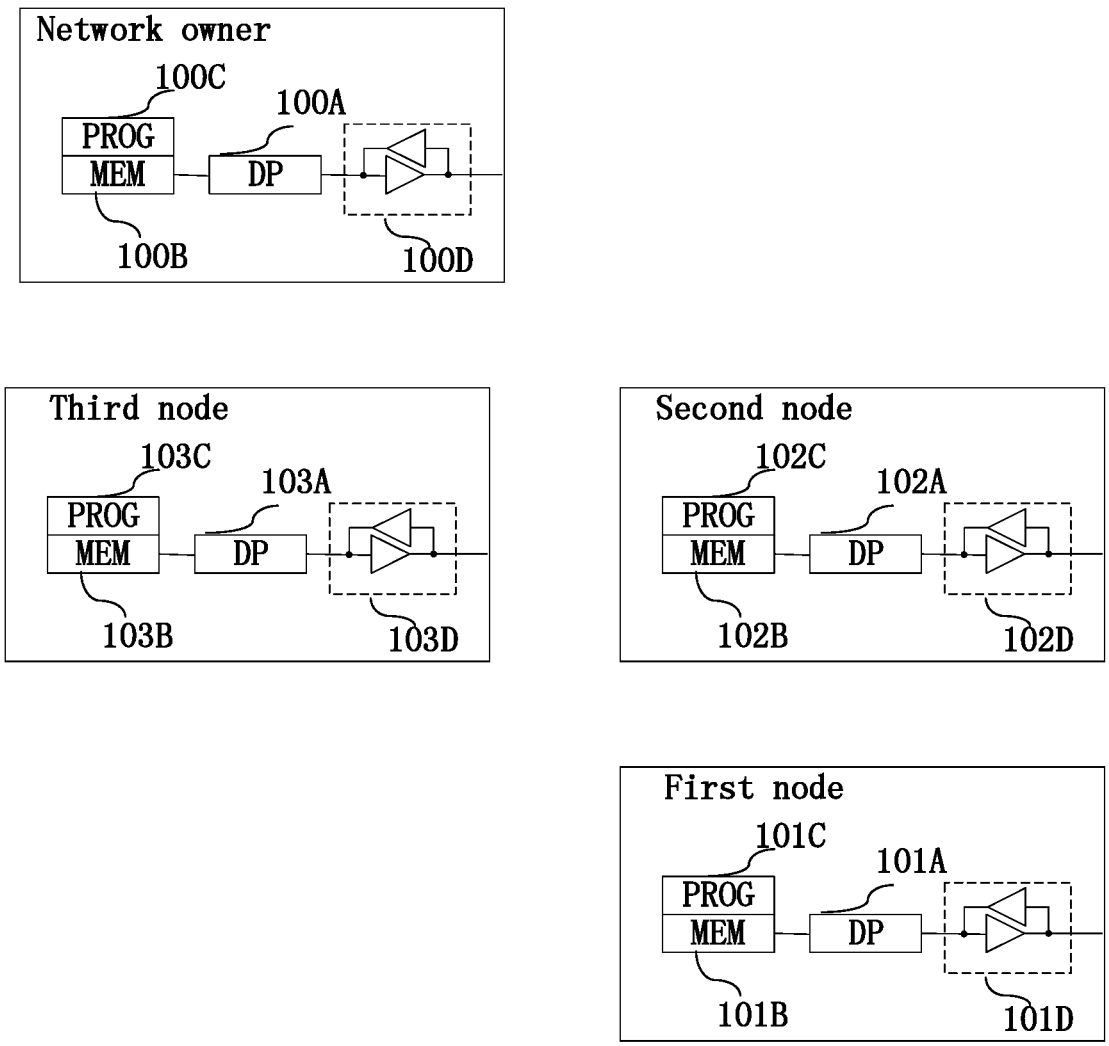
FIG. 11 is a simplified block diagram of various apparatuses which are suitable for use in practicing exemplary embodiments of the present disclosure.

FIG. 11 is a simplified block diagram of various apparatuses which are suitable for use in practicing exemplary embodiments of the present disclosure. In FIG. 11, the network owner 100 may include a data processor (DP) 100A, a memory (MEM) 100B that stores a program (PROG) 100C, and a suitable transceiver 100D for communicating with nodes in the network. The first node 101 may include a data processor (DP) 101A, a memory (MEM) 101B that stores a program (PROG) 101C, and a suitable transceiver 101D for communicating with an apparatus such as the second node 102. Similarly, the second node 102 may include a data processor (DP) 102A, a memory (MEM) 102B that stores a program (PROG) 102C, and a suitable transceiver 102D for communicating with an apparatus such as the first node 101. Similarly, the third node 103 may include a data processor (DP) 103A, a memory (MEM) 103B that stores a program (PROG) 103C, and a suitable transceiver 103D for communicating with an apparatus such as the second node 102, or the network owner 100.

For example, at least one of the transceivers 101D, 102D, 103D, 100D may be an integrated component for transmitting and/or receiving signals and messages. Alternatively, at least one of the transceivers 101D, 102D, 103D, 100D may include separate components to support transmitting and receiving signals/messages, respectively. The respective DPs 101A, 102A, 103A and 100A may be used for processing these signals and messages.

Alternatively or additionally, the first node 101, the second node 102, the third node 103 and the network owner 100 may include various means and/or components for implementing functions of the foregoing steps and methods described above. For example, the second node 102 may include: attesting means for attesting a first node 101 in a network, and generating means for generating an attestation result of the first node. The third node 103 may include: obtaining means for a plurality of attestation results of a first node from a plurality of second nodes 102 adjacent to the first node 101 in a network, and determining means for determining a credibility of the first node based on the plurality of attestation results. The network owner 100 may include: setting means for setting a credit value for a plurality of nodes in a network (such as the first node 101, the second node 102, and the third node 103), respectively; and assigning means for assigning the plurality of nodes (such as the first node 101, the second node 102, and the third node 103) into a plurality of clusters; and selecting means for selecting a third node 103 with the highest credit value in a cluster as a cluster head.

At least one of the PROGs 101C, 102C, 103C, 100C is assumed to include program instructions that, when executed by the associated DP, enable an apparatus to operate in accordance with the exemplary embodiments, as discussed above. That is, the exemplary embodiments of the present disclosure may be implemented at least in part by computer software executable by the DP 101A of the first node 101, by the DP 102A of the second node 102, by the DP 103A of the third node 103, and by the DP 100A of the network owner 100, or by hardware, or by a combination of software and hardware.

The MEMs 101B, 102B, 103B and 100B may be of any type suitable to the local technical environment and may be implemented using any suitable data storage technology, such as semiconductor based memory devices, flash memory, magnetic memory devices and systems, optical memory devices and systems, fixed memory and removable memory. The DPs 101A, 102A, 103A and 100A may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the disclosures may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be realized by one of skills in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the disclosure have been disclosed, those having ordinary skills in the art will understand that changes can be made to the specific embodiments without departing from the spirit and scope of the disclosure. The scope of the disclosure is not to be restricted therefore to the specific embodiments, and it is intended that the appended claims cover any and all such applications, modifications, and embodiments within the scope of the present disclosure.

This listing of claims will replace all prior versions, and listings, of claims in the application:

The invention claimed is:

1. A second node of a network comprising a set of nodes including at least the second node and a first node, the second node comprising:
   at least one processor; and
   at least one memory comprising computer program code,
   the at least one memory and the computer program code configured to, with the at least one processor, cause the second node to perform at least the following:
   attest the first node in the network, the first node being adjacent the second node in the network; and
   generate an attestation result of the first node and send the attestation result to a third node in the network;
   wherein a plurality of second nodes adjacent the first node is configured to generate a plurality of attestation results of the first node and to send the plurality of attestation results to the third node for combination to determine a credibility of the first node.

2. The second node according to claim 1, wherein the at least one memory and the computer program code are configured to, with the at least one processor, cause the second node to:
obtain the credibility of the first node; and
disconnect from the first node, in response to the credibility of the first node indicating the first node is untrustworthy.

3. The second node according to claim 1, wherein in attesting the first node, the at least one memory and the computer program code are configured to, with the at least one processor, cause the second node to:
obtain a credit value of the first node;
determine whether the credit value is less than a credit threshold; and
attest the first node, in response to the credit value being less than the credit threshold.

4. The second node according to claim 1, wherein in attesting the first node, the at least one memory and the computer program code are configured to, with the at least one processor, cause the second node to attest the first node periodically.

5. The second node according to claim 1, wherein in attesting the first node, the at least one memory and the computer program code are configured to, with the at least one processor, cause the second node to:
send an attestation request to the first node; and
receive an attestation response from the first node;
wherein the attestation result is generated based on the attestation response.

6. The second node according to claim 5, wherein in generating the attestation result based on the attestation response, the at least one memory and the computer program code are configured to, with the at least one processor, cause the second node to:
determine a response time of the first node;
generate the attestation result indicating the attestation fails, in response to the response time is longer than a response time threshold;
verify the attestation response, in response to the response time being less than the response time threshold;
generate the attestation result indicating the attestation fails, in response to the attestation response being unsuccessfully verified; and
generate the attestation result indicating the attestation succeeds, in response to the attestation response being successfully verified.

7. The second node according to claim 1, wherein the at least one memory and the computer program code are configured to, with the at least one processor, further cause the second node to:
detect an abnormal behavior of the first node; and
report the abnormal behavior of the first node.

8. A plurality of second nodes of a network comprising a set of nodes including at least the plurality of second nodes and a first node, each second node comprising:
at least one processor; and
at least one memory comprising computer program code, the at least one memory and the computer program code configured to, with the at least one processor, cause the each second node to perform at least the following:
attest the first node in the network, the first node being adjacent the each second node in the network; and
generate an attestation result of the first node and send the attestation result to a third node in the network;
wherein the plurality of second nodes generate a plurality of attestation results of the first node and send the plurality of attestation results to the third node for combination to determine a credibility of the first node.

9. The plurality of second nodes according to claim 8, wherein the at least one memory and the computer program code are configured to, with the at least one processor, cause the each second node to:
obtain the credibility of the first node; and
disconnect from the first node, in response to the credibility of the first node indicating the first node is untrustworthy.

10. The plurality of second nodes according to claim 8, wherein in attesting the first node, the at least one memory and the computer program code are configured to, with the at least one processor, cause the each second node to:
obtain a credit value of the first node;
determine whether the credit value is less than a credit threshold; and
attest the first node, in response to the credit value being less than the credit threshold.

11. The plurality of second nodes according to claim 8, wherein in attesting the first node, the at least one memory and the computer program code are configured to, with the at least one processor, cause the each second node to attest the first node periodically.

12. The plurality of second nodes according to claim 8, wherein in attesting the first node, the at least one memory and the computer program code are configured to, with the at least one processor, cause the each second node to:
send an attestation request to the first node; and
receive an attestation response from the first node;
wherein the attestation result is generated based on the attestation response.

13. The plurality of second nodes according to claim 12, wherein in generating the attestation result based on the attestation response, the at least one memory and the computer program code are configured to, with the at least one processor, cause the each second node to:
determine a response time of the first node;
generate the attestation result indicating the attestation fails, in response to the response time is longer than a response time threshold;
verify the attestation response, in response to the response time being less than the response time threshold;
generate the attestation result indicating the attestation fails, in response to the attestation response being unsuccessfully verified; and
generate the attestation result indicating the attestation succeeds, in response to the attestation response being successfully verified.

14. The plurality of second nodes according to claim 8, wherein the at least one memory and the computer program code are configured to, with the at least one processor, further cause the each second node to:
detect an abnormal behavior of the first node; and
report the abnormal behavior of the first node.

\* \* \* \* \*